Aug. 22, 1933.                D. HEWITT                  1,923,977
                          COMBINE RECLEANER
                    Filed Feb. 16, 1931        3 Sheets-Sheet 1
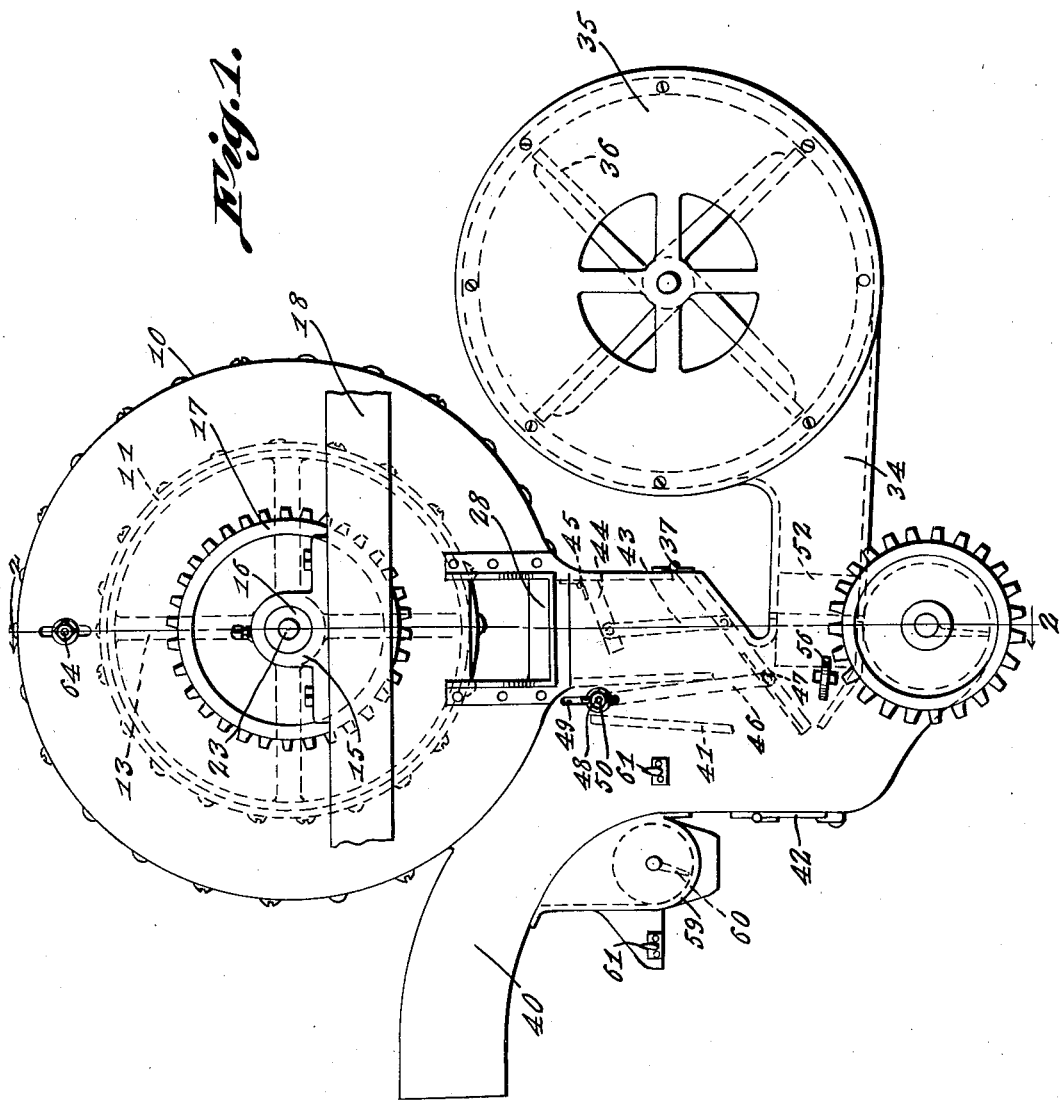
David Hewitt, INVENTOR
BY /s/ Evans
ATTORNEY

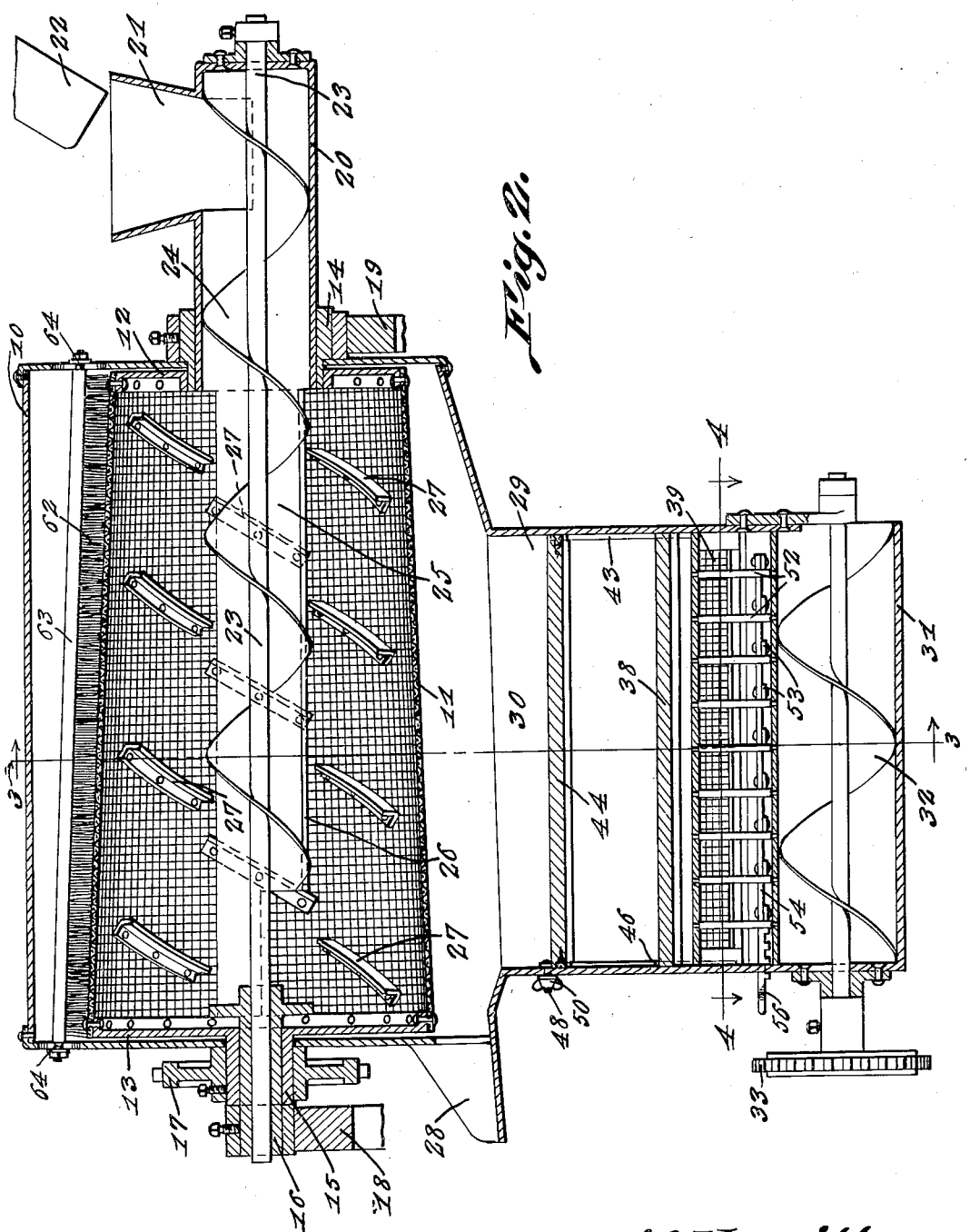

Aug. 22, 1933.  D. HEWITT  1,923,977
COMBINE RECLEANER
Filed Feb. 16, 1931  3 Sheets-Sheet 3
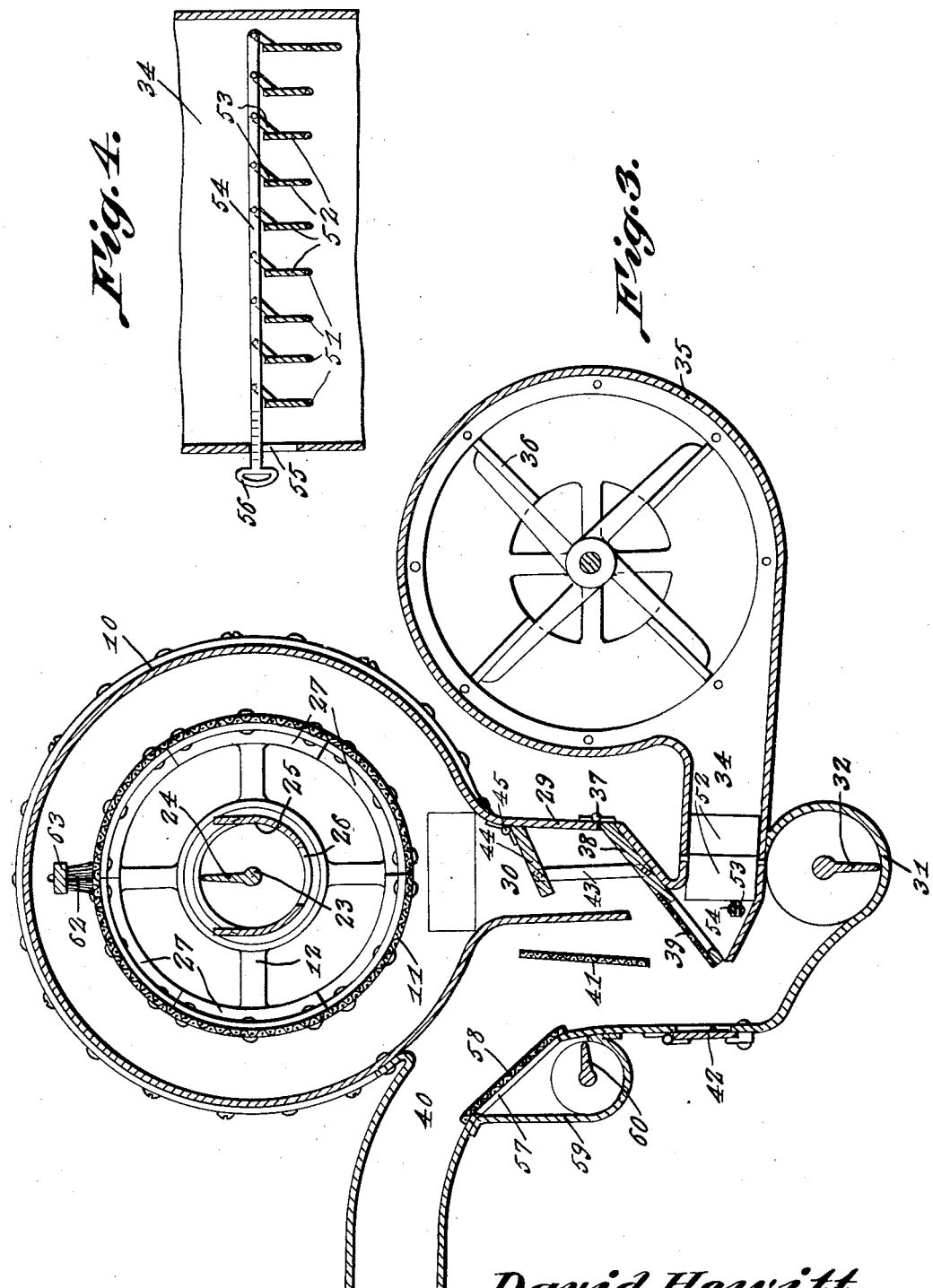
David Hewitt, INVENTOR

UNITED STATES PATENT OFFICE 1,923,977

COMBINE RECLEANER

David Hewitt, Flint, Mich.

Application February 16, 1931. Serial No. 516,118

1 Claim. (Cl. 209—37)

This invention relates to grain separators especially designed to receive grain from an elevator or other source and subject the same to a dual cleaning action, to first separate the larger foreign particles from the grain and then separate the smaller and lighter particles therefrom so that the grain will be thoroughly and effectually cleaned.

Another object of the invention is the provision of a machine of the above character which is simple and economical in construction and reliable and efficient in use.

With the above and other objects in view, the invention further includes the following novel features and details of construction, to be hereinafter more fully described, illustrated in the accompanying drawings and pointed out in the appended claim.

In the drawings:—

Figure 1 is an end elevation of the machine.

Figure 2 is a section on the line 2—2 of Figure 1.

Figure 3 is a section on the line 3—3 of Figure 2.

Figure 4 is a section on the line 4—4 of Figure 2.

Referring to the drawings in detail wherein like characters of reference denote corresponding parts, the machine comprises a housing which includes a substantially cylindrical portion 10 which may be of metal or any other suitable material. Mounted for rotation within this portion of the housing is an articulated drum 11. This drum is open at each end and the ends are supported by spiders 12 and 13, the former bearing upon a collar 14 secured in one end of the cylindrical portion 10, while the spider 13 carries a hub 15 which bears upon a sleeve 16 extending from the opposite end of the cylindrical portion of the housing. A sprocket 17 is secured upon the hub 15 and provides means whereby the drum may be rotated. The sleeve 16 is supported in a suitable standard 18, while the collar 14 is supported in a suitable bearing standard 19.

Extending from the collar 14 is a cylindrical portion 20 of relatively small diameter and provides a feed chute which is in communication with a hopper 21. This hopper is adapted to receive seed to be cleaned from an elevator chute 22 or other source of supply.

Extending axially through the drum is a shaft 23 which forms a part of a spiral conveyor 24, the said shaft being mounted in the outer end of the portion 20 and in the sleeve 16. This shaft operates within a trough 25 which extends longitudinally within the drum 11 and is provided in its bottom with a longitudinal slot 26 whereby grain fed into the drum by the conveyor will pass through the opening 26.

The drum 11 is tapered as shown in Figure 2 of the drawings and the grain enters the small end of the drum and is taken up by agitators 27 which are secured within the drum. The grain and smaller particles of foreign matter pass through the drum, while the larger foreign matter passes out of the large end of the drum through a discharge spout 28 at one end of the housing.

Extending from the cylindrical portion of the housing is a vertically disposed reduced portion 29 which provides a grain passage 30 and located at the lower end of this passage is a conveyor housing 31 within which operates a spiral or other conveyor 32. The shaft of the conveyor 32 has mounted thereon a sprocket wheel 33 and this sprocket wheel and the sprocket wheel 17 may be driven from any suitable source of power.

Communicating with the passage 30 is a discharge passage 34 of a blower housing 35 within which is mounted a fan 36 which may be driven by any suitable means. Hingedly mounted as at 37 at the juncture of the passages 30 and 34 is a delivery board 38 which includes the chaff screen 39. This screen is positioned at the inner end of the passage 34 so that a current of air from the fan 36 may pass through the passage 34 and through the screen 39. As the grain passes through the passage 30 it strikes the delivery board 38 and passes over the screen 39 so that the chaff and other light foreign particles will be blown from the grain and will pass outward through an outlet passage 40 whose inner end communicates with the passage 30. A deflector screen 41 is located in the passage 40 so that should any of the grain be forced upward it will strike the deflector screen 41 and will fall downward into the conveyor 32. A normally closed hand hole 42 is provided whereby access may be had to the screen 39 and other elements within the housing.

The delivery board 38 is connected by means of links 43 with a deflector board 44 which is hingedly mounted as at 45. A rod 46 is pivotally secured to the delivery board 38 as shown at 47 and the upper end of this rod carries a threaded stud 48 which passes through an opening or slot 49 provided in the housing. A binding nut 50 mounted on the stud 48 serves to hold the rod against movement and consequently hold the delivery board 38 and the deflector board 44 in their adjusted positions.

In order to control the current of air passing into the chute 30, the chute 34 has pivotally mounted therein as shown at 51, a plurality of shutters 52. These shutters are connected by means of arms 53 with an operating rod 54. This rod passes through an opening 55 provided in the housing and carries at its outer end a handle 56. By moving the rod longitudinally, the shutters may be simultaneously adjusted to regulate the passage 34.

The outlet passage 40 is provided with an opening 57 which is covered by a screen 58, to provide communication with a trough 59 within which operates a spiral conveyor 60. Any grain which may be blown upward past the deflector screen 41, will fall upon the screen 58 and will gravitate backward into the conveyor 32. Any small heavy particles of foreign matter will pass through this screen and be carried outward by means of the conveyor 60. Hooks 61 may be provided at the end of the chute 59 to provide supporting means for a bag.

A brush 62 is mounted in the top of the housing upon a rod or bar 63. This brush is inclined in conformity with the taper of the drum and the ends of the rod or bar 63 are adjustably mounted in the housing as shown at 64, so that the brush may be adjusted with respect to the drum to keep the periphery of the latter clean for the passage of the grain.

The invention is susceptible of various changes in its form, proportions and minor details of construction and the right is herein reserved to make such changes as properly fall within the scope of the appended claim.

Having described the invention what is claimed is:—

In a grain separator, a cylindrical housing, an articulated drum rotatably supported within the housing and having opposite open ends, spiders journaled in the ends of the housing and rotatably supporting said drum at opposite open ends thereof, a feed chute communicating centrally with the housing and said drum, a trough extending longitudinally within the drum, communicating with said feed chute and having a longitudinal slot in its bottom, a conveyor spiral operating in said chute and trough, the drum being tapered in the direction of the feed chute, spirally arranged agitators secured within the drum, a discharge spout leading from one end of the housing, a vertically disposed reduced portion depending from the housing at its lowermost point and forming a grain passage, a vertically swinging adjustable delivery board arranged within the reduced portion of the housing, a vertically swinging deflector board in the reduced portion of the housing above the delivery board, a link connecting the deflector board and delivery board together whereby simultaneous adjustment thereof may be had, a screen fitted in the delivery board and disposed outside of the reduced portion of the housing, and a blower housing related with the reduced portion of the housing and having its air discharge in confronting relation to the screen whereby the blown air from the blower housing will pass through the screen to be active upon grain agitated by the deflector board for separating chaff and other light foreign particles from the grain upon the latter reaching the delivery board.

DAVID HEWITT.